(12) United States Patent
Nottingham et al.

(10) Patent No.: US 11,436,568 B2
(45) Date of Patent: Sep. 6, 2022

(54) SERVICE KIOSK DEVICE PROVISIONING

(71) Applicant: Hewlett-Packard Development Company, L.P., Spring, TX (US)

(72) Inventors: Kyle J Nottingham, Boise, ID (US); Matthew Frederickson, Boise, ID (US); Gerold K Shelton, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,806

(22) PCT Filed: Apr. 30, 2018

(86) PCT No.: PCT/US2018/030280
§ 371 (c)(1),
(2) Date: Jul. 29, 2019

(87) PCT Pub. No.: WO2019/212509
PCT Pub. Date: Nov. 7, 2019

(65) Prior Publication Data
US 2022/0004999 A1    Jan. 6, 2022

(51) Int. Cl.
*G06Q 10/00* (2012.01)
*G07C 9/29* (2020.01)
(Continued)

(52) U.S. Cl.
CPC ............. *G06Q 10/20* (2013.01); *G06F 8/61* (2013.01); *G06K 19/0723* (2013.01); *G07C 9/29* (2020.01)

(58) Field of Classification Search
CPC . G06Q 10/20; G07C 9/29; G06F 8/61; G06K 19/0723
(Continued)

(56) References Cited

U.S. PATENT DOCUMENTS 8,146,072 B2   3/2012   Trueba
8,161,330 B1   4/2012   Vannatter et al.
(Continued)

FOREIGN PATENT DOCUMENTS

KR    10-1678816       7/2009
KR    10-2015-0026215  3/2015
(Continued)

*Primary Examiner* — Ahshik Kim
(74) *Attorney, Agent, or Firm* — HP Inc. Patent Department (57) ABSTRACT

Examples associated with service kiosk device provisioning are described. One example receiving authentication information associated with a user at a service kiosk. A specification of a device to be delivered to the user, and provisioning data for configuring the device to be delivered to the user are also received at the service kiosk. A selected device is selected from a set of devices stored in compartments of the service kiosk. The set of devices are also operably connected to the service kiosk. The selected device is selected according to the device specification. The selected device is configured based on the provisioning data. A credential matching the authentication information is received from a user via an interface of the service kiosk. Physical access is provided to a compartment of the service kiosk in which the selected device is stored.

17 Claims, 5 Drawing Sheets

(51) Int. Cl.
*G06F 8/61* (2018.01)
*G06K 19/07* (2006.01)

(58) Field of Classification Search
USPC .......................................................... 705/305
See application file for complete search history.

(56) References Cited

U.S. PATENT DOCUMENTS

| | | | |
|---|---|---|---|
| 8,204,622 B2 | 6/2012 | Yepez et al. | |
| 8,235,247 B2 | 8/2012 | Alvarez | |
| 8,307,288 B1 | 11/2012 | Smaltz | |
| 8,549,512 B1 | 10/2013 | Vannatter et al. | |
| 9,452,884 B2 | 9/2016 | Rutledge et al. | |
| 9,508,212 B2 * | 11/2016 | Peters | G06Q 50/26 |
| 2001/0037207 A1 | 11/2001 | Dejaeger | |
| 2002/0046122 A1 | 4/2002 | Barber et al. | |
| 2007/0016676 A1 | 1/2007 | Breuer et al. | |
| 2010/0161343 A1 | 6/2010 | Kennedy et al. | |
| 2011/0060945 A1 | 3/2011 | Leprince et al. | |
| 2011/0161227 A1 | 6/2011 | Santo, Jr. | |
| 2012/0079100 A1 | 3/2012 | McIntyre et al. | |
| 2012/0127307 A1 | 5/2012 | Hassenzahl | |
| 2012/0248183 A1 * | 10/2012 | Cook | G07F 17/0042 |
| | | | 235/381 |
| 2012/0254345 A1 | 10/2012 | Montoya | |
| 2012/0265696 A1 | 10/2012 | Tuchman et al. | |
| 2013/0184856 A1 | 7/2013 | Gregerson | |
| 2013/0335027 A1 | 12/2013 | Xin | |
| 2014/0128023 A1 * | 5/2014 | Guerra | G06Q 30/0645 |
| | | | 455/406 |
| 2015/0077221 A1 | 3/2015 | Peters et al. | |
| 2015/0088731 A1 | 3/2015 | Ackerman | |
| 2015/0269535 A1 | 9/2015 | Parris | |
| 2016/0275518 A1 * | 9/2016 | Bowles | G07F 7/06 |
| 2016/0284019 A1 * | 9/2016 | Bowles | G06Q 20/18 |
| 2017/0256119 A1 * | 9/2017 | Abdelmalak | G07F 7/06 |
| 2018/0041627 A1 | 2/2018 | Maguire et al. | |
| 2019/0172291 A1 * | 6/2019 | Naseath | G07C 9/00912 |

FOREIGN PATENT DOCUMENTS

| | | |
|---|---|---|
| KR | 10-2009-0079114 | 6/2016 |
| KR | 10-1628976 | 11/2016 |

\* cited by examiner

SERVICE KIOSK DEVICE PROVISIONING

BACKGROUND

Computing devices today have become a fundamental part of the way we live and work, as well as smaller and more mobile. Individuals, for example, use computers and mobile devices for entertainment, communication, shopping, and so forth. Further, businesses often provide computers for their employees so that the employees can efficiently carry out their duties across a wide variety of functions. While some businesses take on ownership and maintenance of devices provided to their users, other companies may opt to offload certain information technology costs using a variety of techniques. For example, some companies may rely on a device-as-a-service (DAAS) offering. A DAAS offering may involve periodic payments to a device provider in exchange for user devices and service guarantees for the hardware, software, and so forth, of the devices.

BRIEF DESCRIPTION OF THE DRAWINGS

The present application may be more fully appreciated in connection with the following detailed description taken in conjunction with the accompanying drawings.

DETAILED DESCRIPTION

Examples associated with receptacle isolation are described. As will be more fully described herein, a service kiosk is an apparatus that is meant to store a set of devices for supporting a device-as-a-service model. The service kiosk includes a set of compartments each fitted with connectors to provide a connection between a device stored within the compartment and various control modules embedded in the service kiosk. The service kiosk may be physically installed in a location accessible to employees of a company relying on a device-as-a-service model to provide electronic devices to its employees. When service events associated with devices occur, the employees may visit the kiosk to have their device repaired by the kiosk and/or replaced by backup devices stored in the kiosk. This may increase the uptime of devices assigned to the employees. The backup devices may also reduce support costs associated with sending out technicians to provide support as a device failure can be at least temporarily mitigated by replacing the failed device with a new device in the kiosk, until eventually, a technician can be sent out to efficiently service or replace many devices stored in the kiosk in a single visit.

This disclosure covers the process by which the service kiosk may provision a device for a user and provide that device to the user. The service kiosk may receive provisioning data identifying applications to install on the device, a configuration for various settings, data associated with the user, and so forth. The service kiosk may then use the provisioning data to setup the device without user intervention. This may allow, for example, a new employee to have a device ready for them to pick up and begin working without having to perform certain initial device setups for themselves.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

As used herein, a service kiosk is intended to broadly describe a category of apparatuses used to securely store electronic devices in a manner that allows the devices to be configured while stored in the service kiosk. The service kiosk may have one or more compartments having data and/or power connectors. Devices that are attached to the data connectors may be configured either directly by the service kiosk or remotely by a remote service. Depending on where the devices are in their life cycle, the configuration may include setting up a device for a new user, modifying the device on behalf of a current user (e.g., reconfiguring the device, repairing the device), deprovisioning a device, and so forth. The service kiosk may also include an interface for communicating with and/or authenticating users. Once authenticated, the service kiosk may grant the user access to devices and or compartments to allow the user to perform a task related to a device assigned to the user. The task may involve obtaining a device from the kiosk, storing a device in the kiosk, and so forth. In various examples, the service kiosk may resemble, for example, a vending machine, a set of lockers, a chest of drawers, and so forth. Various structural components of a service kiosk may be made from wood, metal, plastic, or other suitable materials. The service kiosk may include structural elements such as legs, supports, wall fasteners, and so forth.

Consequently, the service kiosk may facilitate fulfilling service guarantees of a device-as-a-service (DAAS) offering. In a DAAS offering, a user or business may periodically pay a device provider for a device and a promise to service the device in the event the device fails. The service guarantee may include a variety of terms and in various examples may cover firmware, software, hardware, device data, user data, periodic lifecycle upgrades, and so forth. In this example, ownership of the device may remain with the device provider. In the event of a failure of the device or some other technical issue related to the device, a service kiosk stationed in a location accessible to the user may allow the device provider to more easily provide technical support for the device, up to and including replacing the device with a working device. For businesses that are relying on several devices at any given time, it may be cost effective for the business to have an on-site service kiosk to be able to quickly provision a new device for a new user, deprovision a device when that device's user leaves the business, and so forth, in addition to the technical support features that may be facilitated by the service kiosk itself. Eventually, when it is determined that the state of the devices in the service kiosk make it likely the service kiosk will begin failing to fulfil the service guarantee to the business (e.g., because the service kiosk is full, empty, has a number of devices in need of repair, or a combination of factors) a technician may be called to service the kiosk and/or devices stored within. This may be less expensive to the business and/or the device provider than having a technician on site, or having a technician called to service each malfunctioning device.

Figure 1:
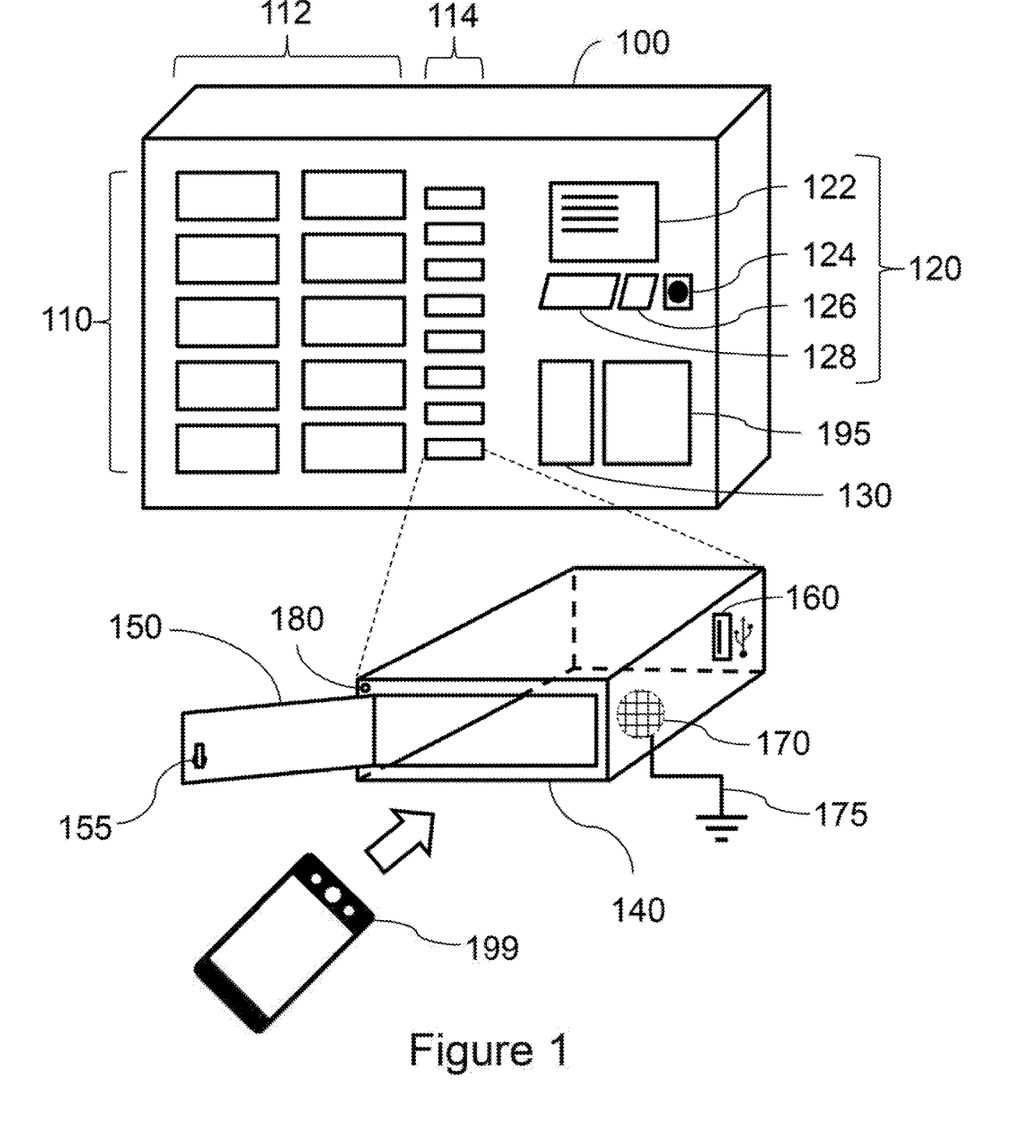
FIG. 1 illustrates an example service kiosk associated with service kiosk device provisioning.

FIG. 1 illustrates an example service kiosk 100 associated with receptacle isolation. Service kiosk 100 includes a set of receptacles 110. While 18 receptacles are shown, in other examples, service kiosk 100 may include a greater or lesser number of receptacles. The receptacles 110 may be adapted for storing electronic devices 199. Different receptacles may be adapted to store different types of electronic devices 199. Here for example, receptacles 112 may be adapted to store a first type of device (e.g., laptops), and receptacles 114 may be adapted to store a second type of device (e.g., cell phones). In other examples, receptacles may be configured to store different types, models, and/or brands of laptops, phones, tablets, or other device types. Receptacles 110 may be adapted to store different types of devices based on a variety of attributes. For example, receptacles 110 for storing phones may be smaller than receptacles 110 for storing laptops.

One receptacle 140 is illustrated in additional detail to further illustrate features of receptacles 110. In this example, receptacle 140 is adapted for storing cellular phones 199. This may affect the size of receptacle 140, connectors 160 installed in receptacle 140, and so forth. Here, receptacle 140 is shown as having a universal serial bus (USB) connector 160. USB connector 160 may provide power to device 199 as well a data connection between device 199 and other components of service kiosk 100. For laptops, receptacles 110 may use a different configuration of connectors 160 for providing power and/or data to a device 199. For example, a regional power adaptor may be used for providing power to devices. The data connection for a laptop may be provided using, for example, an ethernet port, a universal serial bus port, or other types of ports.

It is also worth observing that in other examples, connector 160 may take different physical forms. Here, connector 160 is illustrated as a USB port in the rear wall of receptacle 140. This may mean that to connect device 199 to connector 160, an appropriate cable would also need to be provided. In other examples, connectors 160 may be cables or retractable cables of the appropriate type for connecting to a device type for which receptacle 140 is configured, a docking port of the appropriate type for connecting to a device type for which receptacle 140 is configured, a wireless communication transmitter (e.g., WIFI, Bluetooth) and so forth. The different connector types may have different tradeoffs. For example, a USB port as illustrated may ensure that a device appropriate cable is provided to a user who obtains a device from receptacle 140, but would also mean that a user inserting a device 199 would have to bring or be provided such a cable. Alternatively, a connector that involves an installed cable or docking port may ensure that a person inserting a device into receptacle 140 would be able to insert the device without providing an additional cable, but would mean that a user retrieving a device from receptacle 140 would have to be provided an appropriate cable through an alternative method.

Receptacle 140 also includes a locking mechanism 155. In this example, locking mechanism 155 is illustrated as being attached to a door 150 of receptacle 140. However, locking mechanism 155 may take a variety of forms and its form may depend on the form by which door 150 is designed to give access to users. Here for example, door 150 is illustrated as opening outwards, though in other examples, a sliding, rotating, or retracting door may be appropriate. Locking mechanism 155 may be controllable by other components of service kiosk 100 to grant and restrict access to receptacle 140. These other components and the situations in which access to receptacle 140 may be controlled are more fully discussed below. In some examples, it may also be desirable for locking mechanism 155 to be controllable via a physical mechanism (e.g., a service key). This may allow receptacle 140 to be serviced by a technician to, for example, modify the contents of receptacle 140, repair a component of receptacle 140, and so forth, even when service kiosk 100 is unpowered.

In this example, receptacle 140 is illustrated as incorporating a digital isolator 170. Here, digital isolator 170 is illustrated as a faraday cage 170 that is built into the structure of receptacle 140. Faraday cage 170 may prevent wireless electronic signals from being transmitted by device 199 to devices external to receptacle 140, as well as preventing device 199 from receiving wireless signals from devices external to receptacle 140. In this example, faraday cage 170 is illustrated as being grounded 175, though in other examples, the ground may be excluded. Other digital isolation techniques may also be employed. For example, digital isolation may also be achieved via the port 160 providing a data connection between device 199 and other components of service kiosk 100. By way of illustration service kiosk 100 may implement individualized networks to prevent direct transmission of wired signals between devices in members of the set of receptacles 110. This may also prevent devices 199 from detecting whether other devices are connected to service kiosk 100. Digital isolation may also include signal isolation to ensure secure communication between devices in the receptacles 110 and other components of service kiosk 100. In some examples, digital isolation may also incorporate power isolation.

Service kiosk 100 also includes an interface 120. Interface 120 may include several components. Here interface 120 includes a display 122, a keyboard 128, a keypad 126, and a radio frequency identification (RFID) scanner 124. Interface 120 may use these components to facilitate communicating with user interacting with service kiosk 100. Interface 120 may also include additional components including for example, cameras, touch input devices, external device connectors (e.g., to provide power and/or data to devices not in receptacles 110), and so forth. Interface 120 may also make use of lights 180 associated with individual receptacles 110. These lights 180 may allow the interface to direct a user to a specific receptacle 110 of service kiosk 100. For example, when service kiosk 100 seeks to direct a user to a specific receptacle 110, service kiosk 100 may control a light on that receptacle to turn on, blink, and so forth.

Service kiosk 100 may also include a variety of modules 130 for performing various functions associated with service kiosk 100 and/or configuring devices 199 stored in compartments 110 of service kiosk 100. Modules 130 may be, for example, performed by a processor of a computer embedded in service kiosk 100. In other examples, modules 130 may act as a communication pass through for communications between a remote information technology module (e.g., a device-as-a-service operation) and devices 199 stored in compartments 110 of service kiosk 100.

In various examples, the modules 130 may interact with a user via interface 120, with devices 199 in compartments 110, with other modules 130, and with remote servers and/or devices. For example, modules 130 may include an authentication module. The authentication module may receive a credential from a user and authenticate the credential based on authentication data associated with the user. The authentication data may have been received from a remote information technology module. When the user is successfully authenticated, the authentication module or another module 130 of service kiosk 100 may grant the user access to one or more receptacles 110 of service kiosk 100. The user may provide the credential via user interface 120. The credential may be, for example, a username and password pair that identifies the user that the user inputs via keyboard 128. In another example, the credential may be an RFID signal the user provides via RFID scanner 124. In another example, the user may authenticate themselves by attaching the mobile device 199 to a data connector of service kiosk 100. Multifactor authentication may also be appropriate involving a combination of the above and/or other authentication techniques.

In various examples, service kiosk 100 may be selective about granting user access to receptacles 110. How service kiosk 100 determines which receptacles 110 to which a user is granted access may depend on what function service kiosk 100 is performing for the user. In various examples, the user may be picking up a device from service kiosk 100, storing a device in service kiosk 100, having a device repaired or configured by service kiosk 100, diagnosing a technical issue with a device with the help of service kiosk 100, and so forth. In these examples, service kiosk 100 may grant such a user access only to receptacles associated with the task being performed by service kiosk 100. The user may be granted access to these receptacles 110 by service kiosk 100 controlling locking mechanisms 155 on the respective receptacles 110. In cases where the user is a technician responsible for servicing service kiosk 100, the user may be granted access to specific receptacles, or in some cases general access to all receptacles 110. This may allow the technician to adjust the contents of the receptacles and/or perform physical maintenance on devices stored within service kiosk 100 or on service kiosk 100 itself.

Service kiosk 100 may also include a variety of other components 195. For example, component 195 may be a compartment storing additional supplies that support the purpose of service kiosk 100. By way of illustration, component 195 may store spare parts, extra data and/or power cables, and so forth that may be used by users interacting with service kiosk 100. In other examples, component 195 may also store, for example, packaging and mailing supplies for shipping devices 199 for service. Other potential components 195 may also be contemplated.

Figure 2:
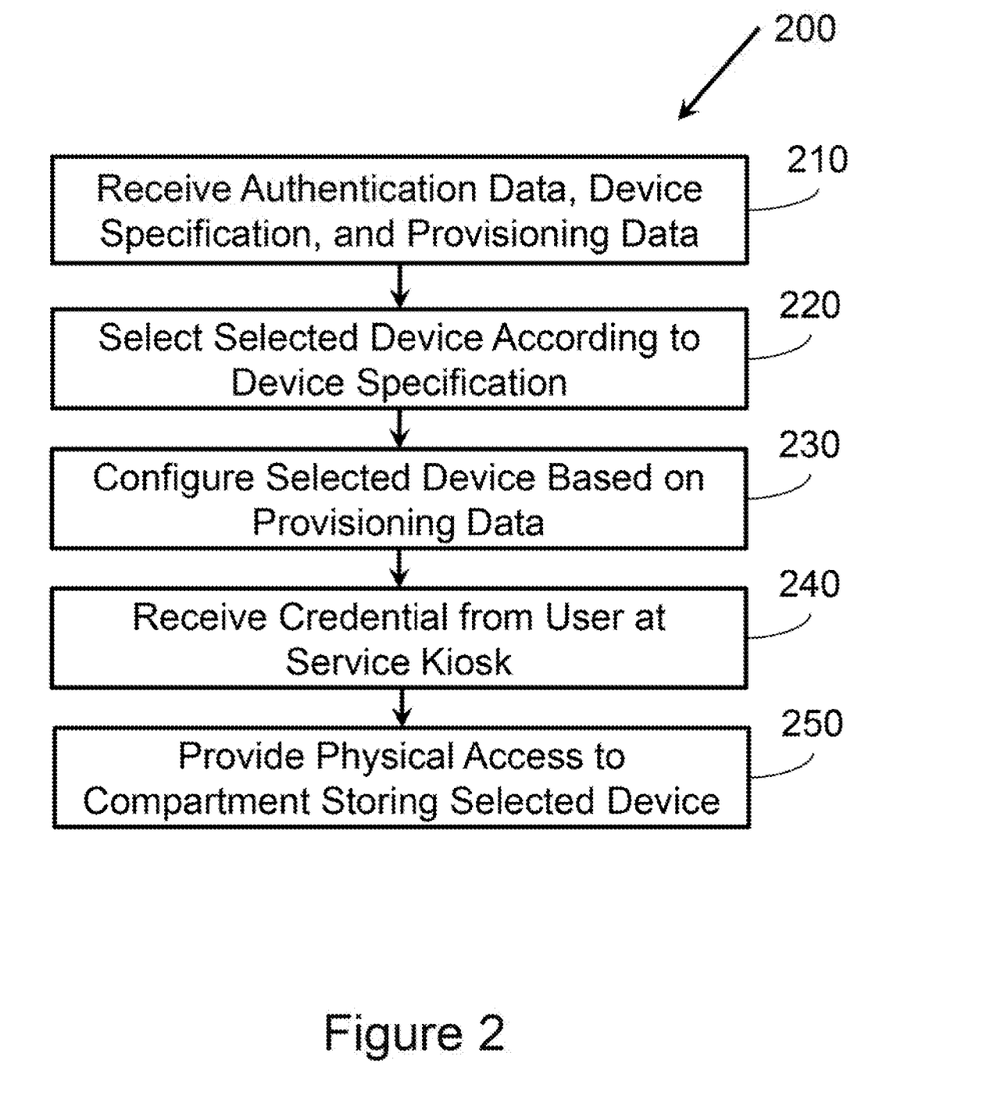
FIG. 2 illustrates a flowchart of example operations associated with service kiosk device provisioning.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with service kiosk device provisioning. Method 200 includes receiving authentication data, a device specification, and provisioning data at 210. The authentication data, the device specification, and the provisioning data may be received at a service kiosk. The authentication data may be associated with a user. For example, the authentication data may specify a credential associated with the user that may be used to authenticate the user. The device specification may describe attributes of a device that should be delivered to the user. The device specification may describe a specific device (e.g., a specific device stored in the service kiosk), a specific model of a device, attributes of a device that should be delivered to the user (e.g., hard disk size, available ram, accessibility features), and so forth. The provisioning data may describe how to configure the device to be delivered to the user. By way of illustration, the provisioning data may identify data to install on the device, applications to install on the device, specific settings to adjust on the device, and so forth. The provisioning data may also identify, for example, settings to change on the device, updates to install on the device, and so forth.

Method 200 also includes selecting a selected device at 220. The selected device may be selected from a set of devices stored in compartments of the service kiosk. Members of the set of devices may be operably connected to the service kiosk. Thus, the service kiosk may include data connectors that allow the service kiosk to communicate with members of the set of devices and/or control members of the set of devices to perform certain tasks. The selected device may be selected according to the device specification. By way of illustration, if the device specification includes a set of attributes describing a device that should be delivered to the user, a device in the service kiosk that is a nearest match to the device specification according to a matching policy may be selected. For example, the matching policy may specify in what scenarios it is appropriate to select a device that over achieves the device specification, under achieves the device specification, and when there are mixed results, which portions of a device specification to prioritize. For example, a matching policy may be configured to prioritize meeting a specified processing level over a data storage level when attempting to ensure a user's device is suitable for the tasks the user will perform.

Method 200 also includes configuring the selected device at 230. The selected device may be configured based on the provisioning data. For example, when the provisioning data identifies applications to be installed on the device to be provided by the user, configuring the selected device may include installing the applications on the selected device, and so forth for other provisioning tasks identified in the provisioning data. In another example, configuring the selected device may include encoding the selected device with tracking data that identifies the device as being associated with the user. By way of illustration, this may be achieved by encoding the tracking data onto a radio frequency identification (RFID) chip embedded in the selected device. This may, for example, allow the user to use the device to facilitate multifactor identification of the user.

Method 200 also includes receiving a credential from the user at 240. The credential may be received via an interface of the service kiosk. The interface may include, a display, a keypad, a keyboard, an RFID scanner, and so forth. Thus, the authentication data may include RFID data to be retrieved from an RFID badge assigned to the user by, for example, an employer of the user. The credential may also be, for example, a password known to the user, a biometric belonging to the user, a multifactor credential, and so forth.

When the credential matches the authentication data received at 210, method 200 includes providing physical access to a compartment of the service kiosk to the user at 250. The compartment of the service kiosk may store the selected device. Note that the user may not be the party to whom the selected device is assigned, but instead an authorized retriever of a device to be delivered to a third party. Thus, the user may be, for example, a manager of the third party, an assistant to the third party, and so forth.

Figure 3:
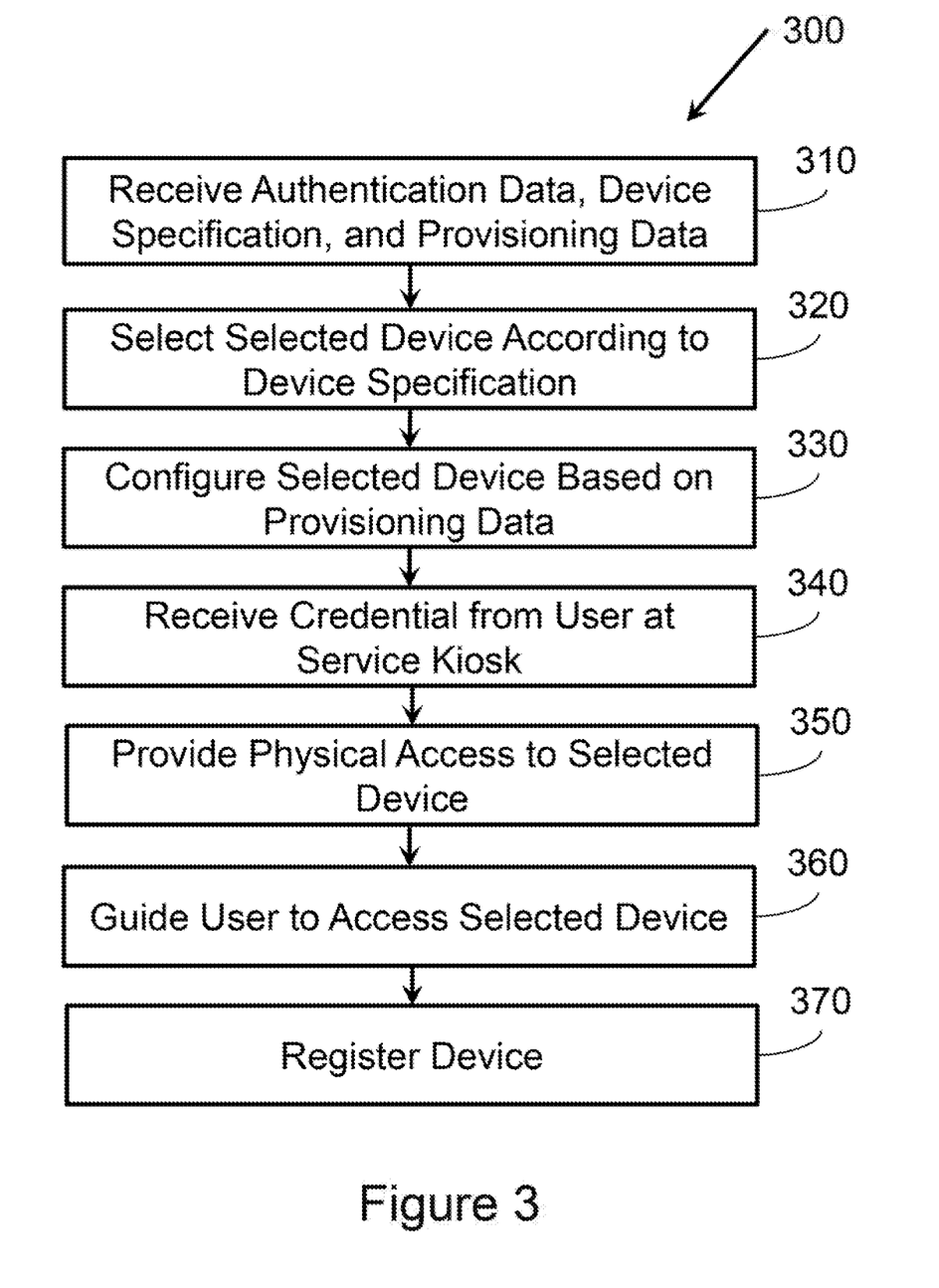
FIG. 3 illustrates another flowchart of example operations associated with service kiosk device provisioning.

FIG. 3 illustrates a method 300 associated with service kiosk device provisioning. Method 300 includes several actions similar to those described above with reference to method 200. For example, method 300 includes receiving authentication data, a device specification, and provisioning data at 310, selecting a selected device at 320, configuring the selected device at 330, receiving a credential from a user at 340, and providing the user physical access to the selected device at 350.

Method 300 also includes, at 360, guiding the user to access the selected device from the compartment in which the selected device is stored. The user may be guided via the interface on the service kiosk. The interface for guiding the user may include, for example, a display on the kiosk that displays a location and/or a number of the compartment in which the selected device is stored, lights on individual compartments of the kiosk that light up or blink to identify the compartment in which the selected device is stored, and so forth. The user may also be guided to, for example, store a received device in the compartment in which the selected device is stored, or a different compartment of the service kiosk. The user may also be guided through the process of performing certain initial setup steps for the selected device.

Method 300 also includes registering the selected device as being assigned to the user at 370. Registering the selected device may be performed to log assignment of the device to a user in an information technology database that facilitates managing device provided to users on behalf of an employer of the user. In some examples, the information technology database may be a part of a device-as-a-service ecosystem operated by an employer of the user. Thus, the service kiosk may be installed in a facility operated by the employer of the user.

Figure 4:
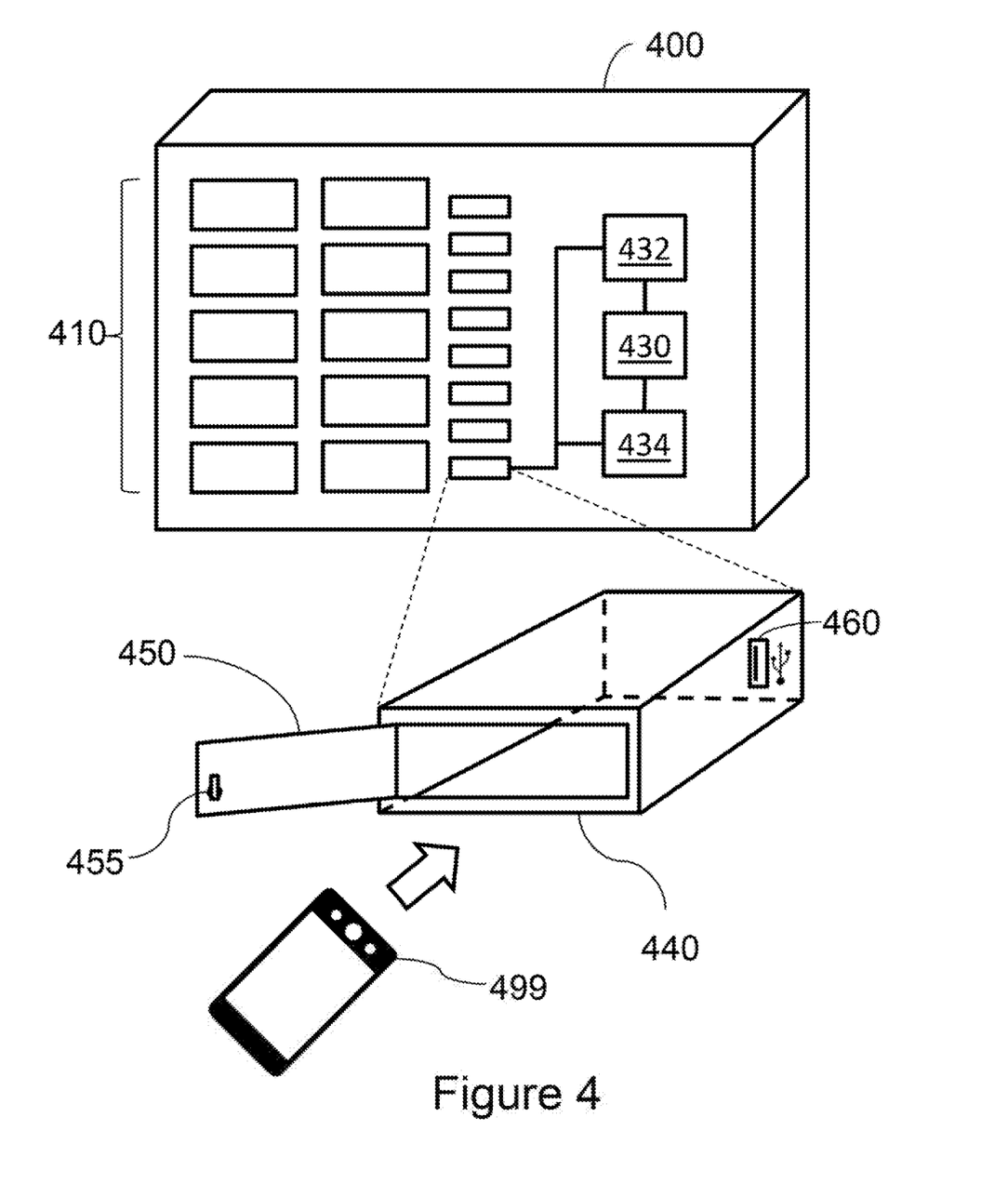
FIG. 4 illustrates another example service kiosk associated with service kiosk device provisioning.

FIG. 4 illustrates an example service kiosk 400 associated with service kiosk device provisioning. Service kiosk 400 includes a set of receptacles 410. An example receptacle 440 is illustrated in additional detail. Each member of the set of receptacles 410 may include an adaptor 460. Adaptor 460 may provide power to an electronic device 499, a data connection between electronic device 499 and components of service kiosk 400, and so forth. Here, adaptor 460 is illustrated as a USB port that provides both power and data connections to device 499. However, in other examples, different connectors may be appropriate for connecting different types of devices to service kiosk 400. Members of the set of receptacles 410 may also include a locking mechanism 455 to secure the contents of the receptacles 410 (e.g., electronic device 499). In this example, locking mechanism 455 is attached to a door 450 of example receptacle 440. Here the locking mechanism may be able to rotate in a manner that prevents door 455 from opening. In other examples, locking mechanism 455 may take other forms. In some examples, receptacles 410 may also include a digital isolator to electrically isolate electronic devices from devices stored in other receptacles. This may prevent electronic devices from communicating with one another, thereby preventing the spread of malware between devices stored in receptacles 410.

Service kiosk 400 also includes a data receipt module 430. Data receipt module 430 may receive a set of data associated with a user. The data associated with the user may include authentication information associated with the user, a specification of a device to be delivered to the user, provisioning data for configuring the device to be delivered to the user, and so forth.

Service kiosk 400 also includes a provisioning module 432. Provisioning module 432 may select a selected device from a selected member of the set of receptacles 410. In this example, device 499 stored in receptacle 440 has been selected. Provisioning module 432 may select the selected device based on the device specification. The device specification may specify a device by, for example, a device type, a device number, attributes of the device, and so forth. Provisioning module 432 may also configure the selected device based on the provisioning data. Configuring the selected device based on the provisioning data may include, for example, installing an application identified in the provisioning data on the selected device, storing data identified in the provisioning data on the selected device, configuring a setting on the selected device according to the provisioning data, and so forth.

Service kiosk 400 also includes an authentication module 434. Authentication module 434 may authenticate the user based on a credential provided by the user. Authentication module 434 may also authenticate the user based on the authentication information associated with the user. When authentication module 434 authenticates the user, authentication module 434 may control a selected locking mechanism (e.g., locking mechanism 455) of the selected member 440 of the set of receptacles 410 to grant physical access to the user. This may allow the user to acquire the selected device 499.

In some examples, service kiosk 400 may also include an interface module (not shown). The interface module may guide the user through the process of, storing a received device from the user in a receptacle 410, obtaining selected device 499 from selected receptacle 440, performing an initial setup of selected device 499, and so forth. Interface module may make use of various components of service kiosk 400 for guiding the user through these processes including, for example, lights on receptacles 410 to identify receptacles 410 the user should access, a display for providing instructions to the user, various input devices for receiving feedback from the user, and so forth.

Figure 5:
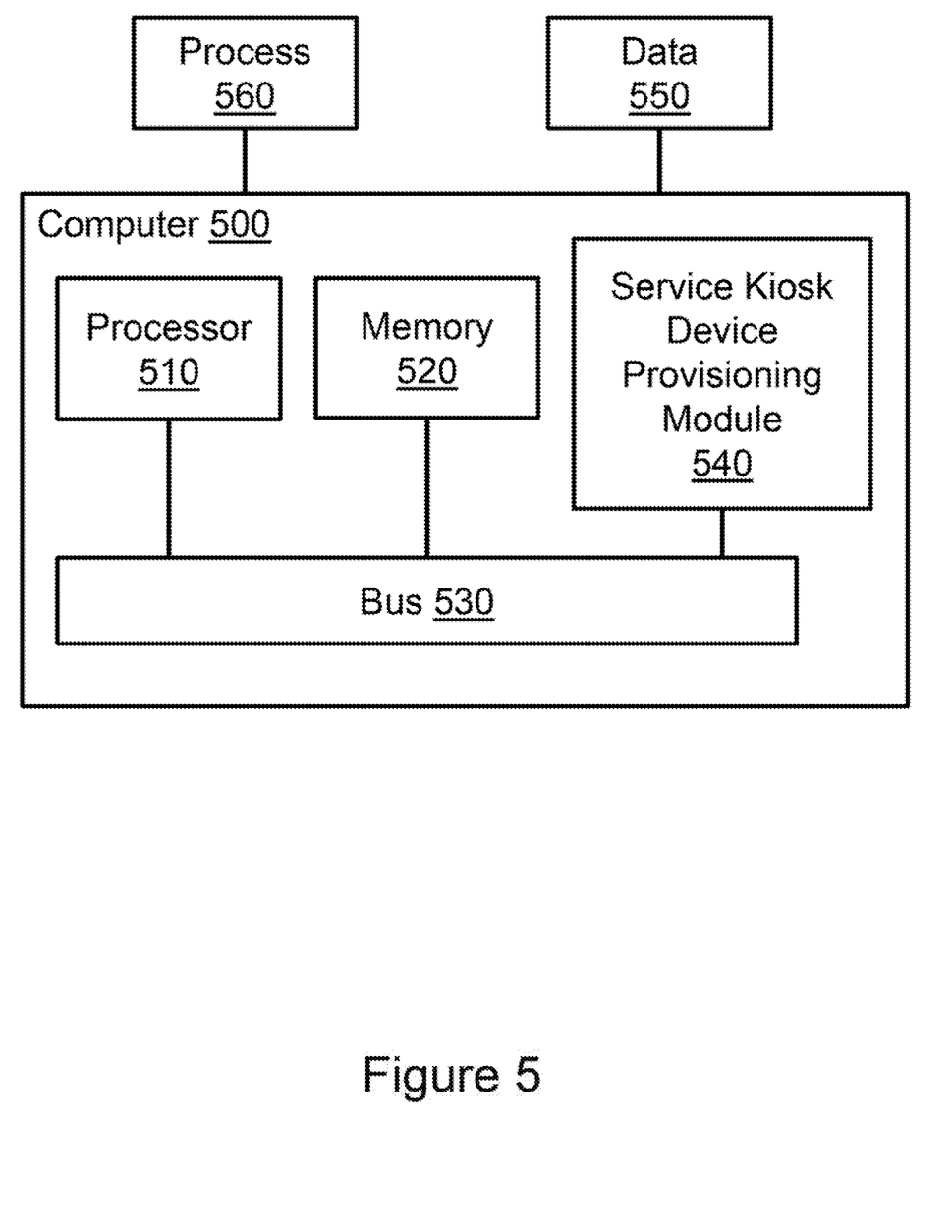
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes a service kiosk device provisioning module 540. Service kiosk device provisioning module 540 may perform, alone or in combination, various functions described above with reference to the example systems, methods, and so forth. In different examples, service kiosk device provisioning module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory, flash memory, memristor) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
    preventing, via digital isolators in each compartment of a service kiosk, wireless electronic signals transmitted from devices stored in each of the compartments of the service kiosk from being transmitted outside of each compartment;
    receiving, at the service kiosk, authentication data with a user, a specification of a device to be delivered to the user, and provisioning data for configuring the device to be delivered to the user;
    selecting a selected device from a set of devices stored in the compartments of the service kiosk, and operably connected to the service kiosk, where the selected device is selected according to the device specification;
    configuring the selected device based on the provisioning data;
    receiving, via an interface of the service kiosk, a credential from the user; and
    providing physical access to a compartment of the compartments of the service kiosk in which the selected device is stored when the credential matches the authentication data.

2. The method of claim 1, where the provisioning data identifies applications to be installed on the device to be provided to the user and where configuring the selected device includes installing the applications on the selected device.

3. The method of claim 1, where configuring the selected device includes encoding the selected device with tracking data that identifies the selected device as being associated with the user.

4. The method of claim 3, where the tracking data is encoded on a radio frequency identification (RFID) chip embedded in the selected device.

5. The method of claim 1, where the authentication data includes (RFID) data to be retrieved from an RFID badge assigned to the user by an employer of the user.

6. The method of claim 1, where the user is an authorized retriever of a device to be obtained on behalf of a third party.

7. The method of claim 1, comprising registering the selected device as assigned to the user in an information technology database that facilitates managing devices provided to users on behalf of an employer of the user.

8. The method of claim 1, comprising, via an interface on the kiosk, guiding the user to, at least one of, retrieve the selected device from the compartment, store a received device in the compartment, store a received device in a different compartment, and perform an initial setup of the selected device.

9. A service kiosk, comprising:
    a set of compartments adapted to store electronic devices, each compartment comprising:
        an adaptor for providing at least one of power to an electronic device stored in a compartment, and a data connection between the electronic device and components of the service kiosk;
        a locking mechanism to secure contents of the compartment; and
        a digital isolator built into a structure of the compartment to prevent wireless electronic signals, transmitted from devices stored in each of the compartments of the service kiosk, from being transmitted outside of each compartment;
    a data receipt module to receive a set of data associated with a user, the data including authentication information associated with the user, a specification of a device to be delivered to the user, and provisioning data for configuring the device to be delivered to the user;
    a provisioning module to select, based on the device specification, a selected device from a selected member of the set of compartments, and to configure the selected device based on the provisioning data; and
    an authentication module to authenticate the user based on a credential provided by the user and based on the authentication information associated with the user, and to control a selected locking mechanism of the selected member of the set of compartments to grant physical access to the user to allow the user to acquire the selected device.

10. The service kiosk of claim 9, where the digital isolator is a faraday cage.

11. The service kiosk of claim 9, comprising an interface module to guide the user through the process of at least one of, storing a received device from the user in the compartment, obtaining the selected device from the selected compartment, and performing an initial setup of the selected device.

12. The service kiosk of claim 9, where configuring the selected device based on the provisioning data includes at least one of, installing an application identified in the provisioning data on the selected device, storing data identified in the provisioning data on the selected device, and configuring a setting on the selected device according to the provisioning data.

13. A non-transitory computer-readable medium storing processor executable instructions that, when executed, control a processor to:
    receive, at a service kiosk, authentication data associated with a user, a specification of a device to be delivered to the user, and provisioning data for configuring the device to be delivered to the user;
    select, based on the device specification, a selected device from a set of devices stored in compartments of the service kiosk, where members of the set of devices are stored in the compartments such that they are operably connected to the service kiosk and are digitally isolated to prevent wireless electronic signals, transmitted from devices stored in each of the compartments of the service kiosk, from being transmitted outside of each compartment;

configure the selected device based on the provisioning data;

register the device as assigned to the user in an information technology database associated with an infrastructure that manages devices provided to users;

receive, via an interface of the service kiosk, a credential from the user that matches the authentication information; and provide physical access to a compartment of the service kiosk in which the selected device is stored by controlling a lock on the compartment.

14. The non-transitory computer-readable medium of claim 13, where the information technology database is a part of a device-as-a-service ecosystem operated by an employer of the user.

15. The non-transitory computer-readable medium of claim 14, where the service kiosk is installed in a facility operated by the employer of the user.

16. The service kiosk of claim 10, where the faraday cage is grounded.

17. The non-transitory computer-readable medium of claim 13, where a different user is granted physical access to the compartments of the service kiosk to service the kiosk based on the credential provided by the different user.

* * * * *